United States Patent … US 11,503,870 B2
Aggarwal et al. … Nov. 22, 2022

(54) PATTERN FILLING IN GARMENT PIECES

(71) Applicant: Adobe Inc., San Jose, CA (US)

(72) Inventors: Vipul Aggarwal, New Delhi (IN);
Naveen Prakash Goel, Noida (IN);
Lakshay Kumar, New Delhi (IN)

(73) Assignee: Adobe Inc., San Jose, CA (US)

( * ) Notice: Subject to any disclaimer, the term of this patent is extended or adjusted under 35 U.S.C. 154(b) by 289 days.

(21) Appl. No.: 16/569,367

(22) Filed: Sep. 12, 2019

(65) Prior Publication Data

US 2021/0076765 A1 Mar. 18, 2021

(51) Int. Cl.
*A41H 3/00* (2006.01)
*G05B 19/4097* (2006.01)

(52) U.S. Cl.
CPC ......... *A41H 3/007* (2013.01); *G05B 19/4097* (2013.01); *G05B 2219/35142* (2013.01); *G05B 2219/45222* (2013.01)

(58) Field of Classification Search
CPC ............... A41H 3/007; G05B 19/4097; G05B 2219/35142; G05B 2219/45222
See application file for complete search history.

(56) References Cited

U.S. PATENT DOCUMENTS

| | | | | |
|---|---|---|---|---|
| 7,657,340 B2* | 2/2010 | Lind | | A41H 3/007 700/132 |
| 7,809,195 B1* | 10/2010 | Greene | | G06V 10/507 382/181 |
| 9,542,069 B2* | 1/2017 | Mulligan | | G06Q 30/0621 |
| 9,661,886 B1* | 5/2017 | Selvarajan | | A41H 3/007 |
| 10,582,733 B2* | 3/2020 | Ellis | | A41H 3/007 |
| 2004/0049309 A1* | 3/2004 | Gardner | | G06T 17/00 700/132 |
| 2006/0110046 A1* | 5/2006 | Luo | | G06V 10/752 382/203 |
| 2009/0112353 A1* | 4/2009 | Kirefu | | D04B 37/02 700/131 |
| 2010/0023155 A1* | 1/2010 | Conrad | | B44B 1/006 700/118 |
| 2015/0208746 A1* | 7/2015 | Schindler | | A41H 3/007 700/132 |
| 2015/0339800 A1* | 11/2015 | Selvarajan | | G06T 3/40 345/419 |
| 2018/0049498 A1* | 2/2018 | Koh | | G05B 19/4097 |
| 2019/0347364 A1* | 11/2019 | Gupta | | G06F 30/00 |
| 2021/0104077 A1* | 4/2021 | Zakharchenko | | G06T 17/005 |

\* cited by examiner

*Primary Examiner* — Thomas C Lee
*Assistant Examiner* — Ameir Myers
(74) *Attorney, Agent, or Firm* — FIG. 1 Patents

(57) ABSTRACT

In implementations of pattern filling in garment pieces, a pattern filling system represents a first garment piece as a first curve and a second garment piece as a second curve. The system determines a relationship between the first garment piece and the second garment piece by comparing the first curve and the second curve. The pattern filling system generates a visually pleasing fill pattern for the first garment piece and the second garment piece based on the determined relationship.

20 Claims, 13 Drawing Sheets

302
Represent a first garment piece as a first curve based on a centroid of the first garment piece and vectors from the centroid of the first garment piece to a boundary of the first garment piece

304
Represent a second garment piece as a second curve based on a centroid of the second garment piece and vectors from the centroid of the second garment piece to a boundary of the second garment piece

306
Identify a relationship between the first garment piece and the second garment piece by comparing the first curve and the second curve

308
Generate a fill pattern for the first garment piece and the second garment piece based on the relationship

*Fig. 3*

PATTERN FILLING IN GARMENT PIECES

BACKGROUND

Conventional garment design and manufacturing is performed using large sheets of material, and garment pieces are cut from these large sheets. The garment pieces are then assembled into garments which is typically accomplished by stitching the pieces together. When the sheets of material include a pattern (e.g., repeating visual objects such as polka dots, stripes, argyle, tartan, plaid, and so forth), continuity of the pattern across garment pieces is desirable for the final garment to be visually pleasing. This pattern continuity can be challenging to accomplish especially at edges of the garment pieces when such edges are stitched together as part of manufacturing the garment. For example, even a relatively small misalignment between portions of an object across garment pieces is easily perceivable and visually displeasing.

Pattern continuity is also challenging to achieve when garment pieces overlap such as when a garment piece is stitched on another garment piece to form a pocket. This is because a pattern of the outside of the pocket must closely align with a pattern on the underlying garment piece or a garment including these garment pieces will not be aesthetically pleasing. Since the garment pieces are conventionally cut from large sheets of material, there are limited corrective actions available when garment pieces are assembled into a portion of a garment and the pattern is not visually pleasing after assembly. In these scenarios, at least one of the garment pieces is wasted and a new garment piece must then be cut as a replacement.

Digital textile printing can reduce some of this waste because continuous pattern printing is not required as patterns are directly printable on garment pieces. By manufacturing garments in this manner, a pattern fill for each garment piece can be pre-designed. However, conventional systems for designing printable garment patterns require significant effort by designers to determine how patterns such as repeating objects are displayed on the garment pieces so that garments including the pieces are aesthetically suitable. Minor omissions in this process create garment fill patterns that are not visually pleasing such as patterns having repeating objects which are overlapping, partially cutoff, in undesirable locations, etc. Thus, conventional systems may provide a designer with an ability to manipulate how garment pieces are assembled into a garment but these systems provide no functionality to improve aesthetics of a fill pattern for the garment.

Conventional systems also require individually specified fill pattern designs for size variations within a garment family. For example, a pattern fill design for garment pieces which are assembled into a small sized garment is not generally usable for garment pieces which are assembled into a large sized garment of the same family. As a result, a pattern fill for the garment pieces which are assembled into the large sized garment must be individually designed. As noted, these individual designs are frequently not visually pleasing because of the shortcomings of conventional systems for designing garment fill patterns.

SUMMARY

Systems and techniques are described for pattern filling in garment pieces. A computing device implements a pattern filling system to determine relationships between individual garment pieces of a garment. For example, the system represents a first garment piece as a first curve based on a geometry of the first garment piece and the system represents a second garment piece as a second curve based on a geometry of the second garment piece. The system compares the first curve and the second curve and identifies a relationship between the first garment piece and the second garment piece from the comparison.

The pattern filling system generates visually pleasing fill patterns for the first and second garment pieces based on the identified relationship. In this manner, the system generates fill patterns having repeating visual objects such that the objects are continuous and aligned across garment pieces of a garment even in scenarios in which the garment pieces are adjacent or overlapping. The system can also shift and/or resize the repeating objects to minimize or prevent object cutoff which improves visual acuity in garment fill patterns. These fill patterns can be generated automatically and without user intervention using the identified relationships between garment pieces.

The described systems improve technology for designing fill patterns for garment pieces by generating visually pleasing fill patterns across sizes within a garment family automatically. This is not possible in conventional systems in which each garment size within a family requires an individual fill pattern design for its pieces. The systems described provide additional functionality not available in conventional systems such as automatic resizing of objects based on dimensions of garment pieces to improve a visual appearance of garments assembled from the garment pieces.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 3 is a flow diagram depicting a procedure in an example implementation in which a first garment piece is represented as a first curve and a second garment piece is represented as a second curve to identify a relationship between the first and second garment pieces and a fill pattern is generated based on the relationship.

DETAILED DESCRIPTION

Overview

Figure 1:
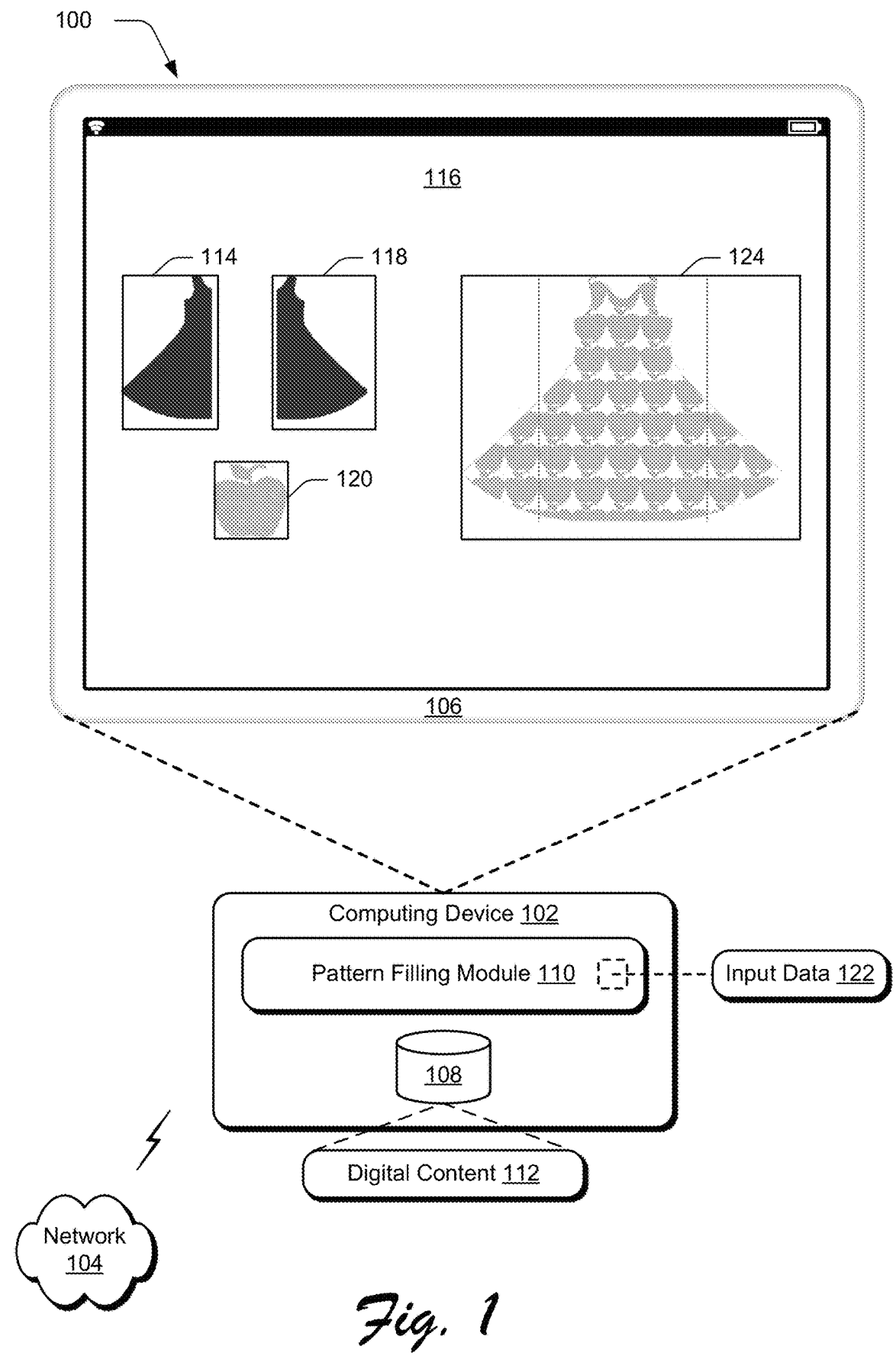
FIG. 1 is an illustration of an environment in an example implementation that is operable to employ digital systems and techniques as described herein.

Digital textile printing is used in garment manufacturing as an alternative to using large sheets of patterned fabric. Instead of cutting pieces from the sheets of patterned fabric, patterns can be printed on individual garment pieces. Thus, garment manufacturing by digital textile printing facilitates use of pre-designed garment piece pattern fills. However, conventional systems for designing these fill patterns require substantial efforts by designers to determine how repeating visual object patterns (e.g., polka dots, stripes, argyle, plaid, etc.) are printed on garment pieces so that the patterns appear visually pleasing when the garment pieces are assembled into garments. This is because conventional systems do not offer any functionality to improve a visual appearance of fill patterns for garments. As a result, fill patterns designed using conventional systems often produce garments having repeating objects which are in undesirable locations, partially cutoff, overlapping, misaligned across garment pieces, and so forth.

Additional technical problems associated with conventional systems include a need to individually specify fill pattern designs for size variations within a garment family. For example, a pattern fill design for garment pieces which are assembled into a small sized garment is not generally usable for garment pieces which are assembled into a large sized garment of the same family. As a result, a pattern fill for the garment pieces must be individually designed for different garment sizes. Since many garments are available in multiple sizes, these additional design specifications within garment families are particularly burdensome for designers using conventional techniques.

To overcome these technical challenges, systems and techniques are described for pattern filling in garment pieces. A pattern filling system is implemented by a computing device to determine relationships between individual garment pieces of a garment and the system generates visually pleasing fill patterns for the garment pieces based on these relationships. In this way, the system can leverage an identified relationship between a first garment piece and a second garment piece to generate fill patterns which will be visually pleasing when the garment pieces are assembled as part of a garment.

In one example, the pattern filling system represents the first garment piece as a first curve based on a geometry of the first garment piece. To do so, the system identifies a centroid of the first garment piece and determines a distance between the centroid and a boundary of the first garment piece at each of a plurality of angles around the centroid. Collectively, these angles and corresponding distances define the first curve which represents the geometry of the first garment piece. For example, a shape of the first curve can provide a representation of a shape of the first garment piece by indicating relative distances between the centroid and the boundary in a 360 degree cycle around the centroid.

In order to identify the relationship between the first and second garment pieces, the system represents the second garment piece as a second curve based on a geometry of the second garment piece. The pattern filling system generates the second curve by identifying a centroid of the second garment piece and determining a distance from the centroid to a boundary of the second garment piece at a plurality of angles around the centroid of the second garment piece. These angles and corresponding distances between the centroid and the boundary define the second curve. In this way, the first and second curves represent the geometries of the first and second garment pieces, respectively.

The system can compare the first curve and the second curve to identify the relationship between the first garment piece and the second garment piece. Because the curves represent the geometries of the garment pieces, comparing the curves is performed to compare the geometries of the garment pieces. Determined similarities and differences between the curves therefore represent similarities and differences in the geometries of the garment pieces. The relationship between the garment pieces can then be identified based on the similarities and/or differences between the geometries of the garment pieces.

In one example, if the first curve and the second curve are identical with respect to one another, then the pattern filling system may identify the relationship between the first garment piece and the second garment piece as being an identical relationship. In another example, if the first curve and the second curve are identical but shifted relative to each other, then the pattern filling system can determine that the first garment piece is rotated relative to the second garment piece or the second garment piece is rotated relative to the first garment piece. For example, if the first curve and the second curve are the same but the second curve is reflected about a y-axis and thereafter shifted 180 degrees relative to the first curve, then the system can determine that the first garment piece and the second garment piece have a mirror or a complementary relationship. This is because the curve comparison indicates that the second garment piece is flipped about the y-axis relative to the first garment piece and thus the second garment piece mirrors or complements the first garment piece.

Consider an example in which the pattern filling system can normalize the first curve and the second curve to remove an effect of scaling between the first garment piece and the second garment piece. In this example, the system normalizes the distances corresponding to the angles of the first curve such that the distances have a mean of zero and a standard deviation of one. The system also normalizes the distances corresponding to the angles of the second curve such that these distances have a mean of zero and a standard deviation of one. Continuing this example, the second garment piece is a scaled version of the first garment piece, e.g., the second garment piece may be for a small sized garment and the first garment piece may be for a large sized garment of the same garment family A comparison of the normalized first curve and the normalized second curve will indicate that the first and second curves are identical because the normalization has removed the effect of scaling between the first and second garment pieces. Accordingly, if the system compares the first and second curves and this comparison indicates the curves are different before normalization but a comparison of the normalized first and second curves indicates that the curves are identical, then the system can determine that the second garment piece is a scaled version of the first garment piece.

The pattern filling system can generate fill patterns for the first garment piece and the second garment piece based on the identified relationship between the first and second garment pieces. If the relationship between the first garment piece and the second garment piece is an identical relationship, then the system may generate an identical fill pattern for the first and second garment pieces. The system may generate a mirrored fill pattern for the first garment piece and the second garment piece, e.g., if the relationship between the first and second garment pieces is a mirrored relationship. Similarly, if the relationship between the first and second garment pieces is a scaled relationship, then the pattern filling system may generate a scaled fill pattern for the first and second garment pieces. In this way, the system can generate aesthetically pleasing fill patterns having repeating objects that are aligned and continuous across garment pieces when the pieces are assembled as a garment. The system can generate such fill patterns even in scenarios in which the first garment piece and the second garment piece are overlapping or adjacent garment pieces.

The pattern filling system can also modify a repeating object to generate the fill patterns such as to resize the object to minimize cutoff of the object in the final garment. The system can further generate visually pleasing fill patterns by resizing the repeating objects and/or minimizing loss of the repeating objects. For example, the system may upscale or downscale the repeating objects to perfectly fit a particular number of the objects between reference points of the garment pieces. In another example, the system can iteratively consider possible fill patterns of the repeating objects and select a fill pattern from the possible fill patterns having the least amount of object loss to generate fill patterns for garment pieces. This significantly improves a visual appearance of garments having such fill patterns.

The described systems improve technology for designing fill patterns for garment pieces by using identified relationships of the garment pieces to generate fill patterns across sizes within a garment family automatically. Each garment size within a family requires individual specification using conventional garment design systems. The described systems also provide functionality which is not available in conventional systems such as automatic resizing of objects based on dimensions of garment pieces to improve a visual appearance of garments assembled from the garment pieces. Thus, the described systems improve garment design technology by improving an aesthetic quality of fill patterns in garment pieces which can be performed automatically and without user intervention.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The illustrated environment 100 also includes a display device 106 that is communicatively coupled to the computing device 102 via a wired or a wireless connection. A variety of device configurations may be used to implement the computing device 102 and/or the display device 106. The computing device 102 includes a storage device 108 and a pattern filling module 110. The storage device 108 is illustrated to include digital content 112. An example of the digital content 112 is a first garment piece 114 which is displayed in a user interface 116 on the display device 106. A second garment piece 118 and an object 120 are also displayed in the user interface 116, and data describing the first garment piece 114, the second garment piece 118, and the object 120 may be included in input data 122.

As described, the object 120 corresponds to a visual object in a pattern which may repeat across the pattern. In this example, the object 120 is depicted as an "apple," but the object 120 can be any type of visual object in a pattern such as shapes, pictures, symbols, graphics, outlines, letters, numerals, and so forth. In many scenarios, patterns have multiple different visual objects which repeat across the pattern such as a pattern that mixes animals with letters or stars with rocket ships. In such scenarios, the object 120 can include multiple objects or the pattern may include multiple objects 120.

The pattern filling module 110 is illustrated as having, receiving, and/or transmitting input data 122. For example, the computing device 102 may implement the pattern filling module 110 to receive the input data 122 which can include data describing the first garment piece 114, the second garment piece 118, and the object 120, and the pattern filling module 110 can process the input data 122 to generate a fill pattern 124 for the first garment piece 114 and the second garment piece 118 using the object 120. As shown in FIG. 1, the user interface 116 includes this fill pattern 124 and the pattern filling module 110 can generate the fill pattern 124 automatically by determining a relationship between the first garment piece 114 and the second garment piece 118. In an example, the pattern filling module 110 is implemented to generate the fill pattern 124 by concatenating the first garment piece 114 and the second garment piece 118 based on the relationship and applying the object 120 to the concatenated garment pieces.

Figure 2:
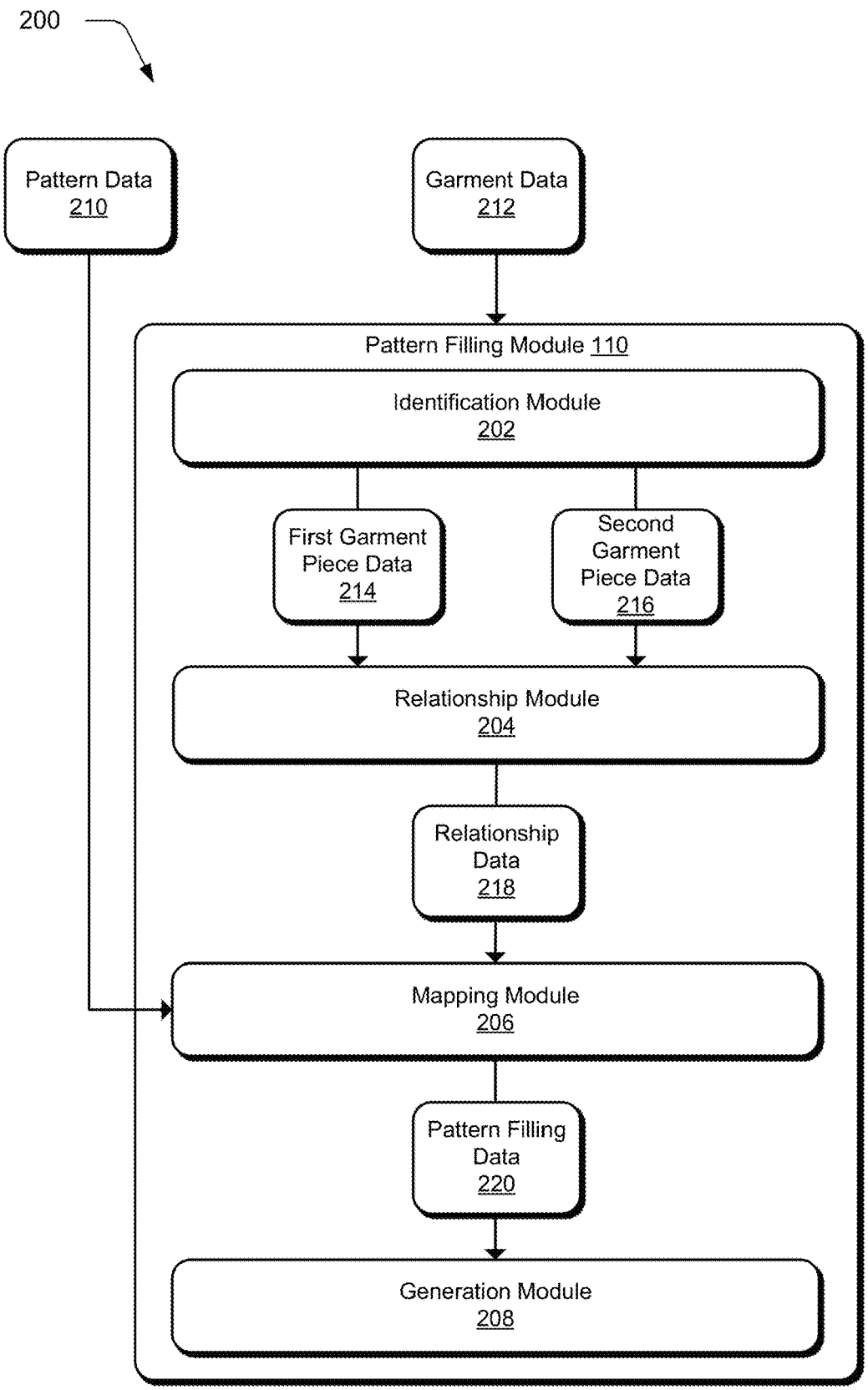
FIG. 2 depicts a system in an example implementation showing operation of a pattern filling module.

FIG. 2 depicts a system 200 in an example implementation showing operation of a pattern filling module 110. The pattern filling module 110 is illustrated as including an identification module 202, a relationship module 204, a mapping module 206, and a generation module 208. The computing device 102 can implement the pattering filling module 110 to receive the input data 122 which can include data describing the first garment piece 114, the second garment piece 118, and the object 120. For example, the input data 122 can include pattern data 210 and garment data 212. The pattern data 210 may describe an object or object to repeat in a fill pattern. This pattern data 210 can include an existing design having objects to be replaced by other objects for use in the fill pattern in one example. The garment data 212 may describe garment pieces to receive the fill pattern.

In an example, the identification module 202 is implemented to receive the garment data 212, e.g., as part of receiving the input data 122. As shown, the identification module 202 is implemented to process the garment data 212 to generate first garment piece data 214 and second garment piece data 216. In one example, the first garment piece data 214 includes data describing the first garment piece 114 which can include data describing a geometry of the first garment piece 114, dimensions of the first garment piece 114, a centroid of the first garment piece 114, a boundary of the first garment piece 114, and so forth. In a similar example, the second garment piece data 216 includes data describing the second garment piece 118 such as data describing a geometry of the second garment piece 118, dimensions of the second garment piece 118, a centroid of the second garment piece 118, a boundary of the second garment piece 118, etc.

As illustrated, the relationship module 204 is implemented to receive the first garment piece data 214 and the second garment piece data 216. The relationship module 204 can process the first garment piece data 214 and the second garment piece data 216 to identify a relationship between the first garment piece 114 and the second garment piece 118. The relationship module 204 generates relationship data 218 that describes the identified relationship between the first garment piece 114 and the second garment piece 118. In some examples, the relationship module 204 identifies a relationship between the first garment piece 114 and the second garment piece 118 based on a geometry of the first garment piece 114 and a geometry of the second garment piece 118. In these examples, the relationship module 204 identifies this relationship by comparing the geometry of the first garment piece 114 and the geometry of the second garment piece 118.

For example, the relationship module 204 processes the first garment piece data 214 to identify a centroid and a boundary of the first garment piece 114. In this way, the relationship module 204 can determine a plurality of distances from the centroid to the boundary of the first garment piece 114. The plurality of distances may be a function of an angle and the relationship module 204 can determine a distance from the centroid of the first garment piece 114 to the boundary of the first garment piece 114 at a first angle, a second angle, a third angle, and so forth. In this manner, the relationship module 204 is implemented to determine a distance between the centroid and the boundary of the first garment piece 114 at angles from 0 to 360 degrees, e.g., in one-degree increments. These angles and corresponding distances collectively define a first curve which represents the first garment piece 114. For example, the first curve can represent the geometry of the first garment piece 114.

Similarly, the relationship module 204 processes the second garment piece data 216 describing the second garment piece 118 to identify a centroid and a boundary of the second garment piece 118. The relationship module 204 can determine a distance from the centroid to the boundary of the second garment piece 118 at each or a plurality of angles around the centroid of the second garment piece 118. In one example, the relationship module 204 is implemented to determine a distance between the centroid and the boundary of the second garment piece 118 at angles from 0 to 360 degrees, e.g., in one-degree increments. Collectively, these angles and corresponding distances define a second curve which represents the second garment piece 118 by representing the geometry of the second garment piece 118.

In some examples, the relationship module 204 normalizes the distances defining the first and second curves to overcome an effect of scaling between different sizes of garment pieces within a garment family. For example, garment pieces can be scaled to larger and smaller sizes for use in larger and smaller sized garments, respectively. Thus, a garment piece for a small version of a garment may be a particular size and this particular size can be scaled up in size for a medium version of the garment and the particular size can be scaled up further for a large version of the garment. By normalizing the distances defining the first and second curves to have a mean equal to 0 and a standard deviation equal to 1, the relationship module 204 removes the effect of scaling in garment pieces for garments of different sizes.

Consider an example in which the first curve and the second curve can be assumed to be cyclic meaning that for any curve, the angle value after 359 degrees automatically begins with 0 degrees to represent a 360 degree cycle. In this example, the first and second curves are a collection of coordinates where each coordinate includes an angle value and a corresponding distance value. The relationship module 204 compares the first curve and the second curve to identify a coordinate of the second curve such that starting at the coordinate, the second curve is similar to the first curve. The second curve may be similar to the first curve if differences between consecutive coordinates of the first and second curves are small, e.g., less than a threshold. If the relationship module 204 identifies such a coordinate, then relationship module 204 can determine that the first garment piece 114 and the second garment piece 118 are similar as having similar geometries.

For example, if the first curve and the second curve are determined to be identical, then the geometry of the first garment piece 114 may be identical to the geometry of the second garment piece 118. In this example, the relationship module 204 determines that the relationship between the first garment piece 114 and the second garment piece 118 is an identical relationship. Thus, the relationship module 204 generates the relationship data 218 which describes the identical relationship between the first garment piece 114 and the second garment piece 118.

In another example, if the first curve and the second curve are determined to be different before normalization of the first and second curve, but the first curve and the second curve are determined to be identical after normalization, then the first garment piece 114 is a scaled version of the second garment piece 118. In this example, the relationship module 204 determines the first and second garment pieces are the same shape for use in different sizes of garments. Based on this determination, the relationship module 204 generates the relationship data 218 which describes a scaled relationship between the first garment piece 114 and the second garment piece 118.

If the relationship module 204 compares the two curves and determines that the first curve and the second curve are similar but are shifted relative to one another, then the relationship module 204 determines that the first garment piece 114 is rotated relative to the second garment piece 118 or that the second garment piece 118 is rotated relative to the first garment piece 114. For example, if the relationship module 204 identifies a coordinate of the second curve such that starting at the coordinate, the second curve is similar to the first curve, then the relationship module 204 may determine that the first garment piece 114 is a rotated version of the second garment piece 118. In this example, the relationship module 204 generates the relationship data 218 which describes a scaled relationship between the first garment piece 114 and the second garment piece 118.

Consider an example in which the relationship module 204 is implemented to compare the first curve and the second curve. Based on this comparison, the relationship module 204 determines that the second curve is reflected about a y-axis and thereafter differs from the first curve by 180 degrees. In this example, the relationship module 204 determines that the relationship between the first garment piece 114 and the second garment piece 118 is a complementary or a mirrored relationship. Accordingly, the relationship module 204 generates the relationship data 218 which describes the complementary or mirrored relationship between the first garment piece 114 and the second garment piece 118.

In one example, relationship information regarding the garment pieces may be included as part of the input data 122. The input data 122 can include data from a computer-aided design (CAD) file which describes dimensions of the first garment piece 114 and the second garment piece 118. This CAD data can also describe a relationship between the first garment piece 114 and the second garment piece 118 such as an adjacent relationship meaning that the first garment piece 114 and the second garment piece 118 are disposed adjacent to one another when used in a garment. The CAD data may describe a relationship between the first garment piece 114 and the second garment piece 118 as an overlapping relationship, e.g., a portion of the first garment piece 114 may overlap a portion of the second garment piece 118 and/or a portion of the second garment piece 118 may overlap a portion of the first garment piece 114.

As shown in FIG. 2, the mapping module 206 receives relationship data 218 which describes a relationship between the first garment piece 114 and the second garment piece 118. In one example, the mapping module 206 is implemented to receive the pattern data 210 which may describe an object to repeat in a fill pattern. For example, the pattern data 210 may describe the object 120, and the mapping module 206 may process the relationship data 218 and the pattern data 210 to map and/or generate a fill pattern of repeating objects 120 for the first garment piece 114 and the second garment piece 118.

The mapping module 206 is implemented to process the relationship data 218 and the pattern data 210 to generate pattern filling data 220 which can describe a fill pattern of repeating objects 120 for the first garment piece 114 and the second garment piece 118. For example, the mapping module 206 can map the object 120 to the first garment piece 114 and the second garment piece 118 based on the identified relationship between the first garment piece 114 and the second garment piece 118 which is described by the relationship data 218. In this manner, the mapping module 206 maps the object 120 to the first garment piece 114 and/or the second garment piece 118 as a fill pattern which is aesthetically pleasing, e.g., as having continuity across the first garment piece 114 and the second garment piece 118, as minimizing cutoff of the object 120, as maximizing a number of repeating objects 120, etc.

Consider one example in which the relationship data 218 and/or the input data 122 describes a relationship between the first garment piece 114 and the second garment piece 118 as being an adjacent relationship. Based on the adjacent relationship, a portion of the first garment piece 114 and a portion of the second garment piece 118 may abut one another when assembled as a garment, and the mapping module 206 can leverage this information to map the objects 120 as a visually pleasing fill pattern. In this example, the mapping module 206 maps the objects 120 to a geometry of the first garment piece 114 and the second garment piece 118 such that the objects 120 are continuous across an adjacent portion of the first garment piece 114 and the second garment piece 118. In this manner, the mapping module 206 maps the objects 120 as a fill pattern for the first garment piece 114 and the second garment piece 118 to preserve seamless continuity between the first garment piece 114 and the second garment piece 118.

Consider another example in which the relationship data 218 and/or the input data 122 describes a relationship between the first garment piece 114 and the second garment piece 118 as being an identical relationship. In this example, the mapping module 206 is implemented to map the objects 120 as identical fill patterns for the first garment piece 114 and the second garment piece 118. For example, the mapping module 206 maps the objects 120 to minimize cutoff of the objects 120 based on the identical relationship between the first garment piece 114 and the second garment piece 118. The mapping module 206 can generates the pattern filling data 220 which can describes these fill patterns for the first garment piece 114 and the second garment piece 118.

Consider an example in which the relationship data 218 and/or the input data 122 describes a relationship between the first garment piece 114 and the second garment piece 118 as being a scaled relationship. For example, the mapping module 206 processes the relationship data 218 and determines a scaling factor between the first garment piece 114 and the second garment piece 118. The mapping module 206 then applies this scaling factor to the object 120. In this manner, the mapping module 206 is implemented to map the object 120 as an aesthetically pleasing fill pattern for the first garment piece 114 and the second garment piece 118. Continuing this example, the mapping module 206 maps the object 120 as a fill pattern for the first garment piece 114 and the mapping module 206 can scale the object 120 up or down. The mapping module 206 scales the object 120 then maps the scaled object 120 as a visually pleasing fill pattern for the second garment piece 118.

Consider another example in which the relationship data 218 and/or the input data 122 describes a relationship between the first garment piece 114 and the second garment piece 118 as being similar but the first garment piece 114 is rotated relative to the second garment piece 118. For example, the mapping module 206 processes the relationship data 218 to determine an amount of rotation between the first garment piece 114 and the second garment piece 118. In this example, the mapping module 206 is implemented to map the object 120 as an aesthetically pleasing fill pattern for the second garment piece 118, and the mapping module 206 can rotate the object 120 by the determined amount of rotation. The mapping module 206 can map the rotated object 120 as an aesthetically pleasing fill pattern for the first garment piece 114. In one or more implementations, the mapping module 206 generates the pattern filling data 220 which describes these aesthetically pleasing fill patterns.

As shown in FIG. 2, the generation module 208 receives the pattern filling data 220, and the generation module 208 processes the pattern filling data 220 to generate fill patterns for garment pieces. For example, the generation module 208 processes the pattern filling data 220 to generate visually pleasing fill patterns for the first garment piece 114 and the second garment piece 118. In one or more implementations, the generation module 208 processes the pattern filling data 220 to generate the fill pattern 124. Although illustrated as separate modules, the pattern filling module 110, the identification module 202, the relationship module 204, the mapping module 206, and the generation module 208 can be implemented as a single module or implemented in less modules than illustrated or implemented in more modules than illustrated.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Details of Pattern Filling in Garment Pieces

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1 and 2.

FIG. 3 is a flow diagram depicting a procedure 300 in an example implementation in which a first garment piece is represented as a first curve and a second garment piece is represented as a second curve to identify a relationship between the first and second garment pieces and a fill pattern is generated based on the relationship. A first garment piece is represented as a first curve (block 302) based on a centroid of the first garment piece and vectors from the centroid of the first garment piece to a boundary of the first garment piece. For example, the pattern filling module 110 is implemented to represent the first garment piece as the first curve. A second garment piece is represented as a second curve (block 304) based on a centroid of the second garment piece and vectors from the centroid of the second garment piece to a boundary of the second garment piece. In an example, the pattern filling module 110 is implemented to represent the second garment piece as the second curve.

A relationship is identified (block 306) between the first garment piece and the second garment piece by comparing the first curve and the second curve. For example, the pattern filling module 110 is implemented to identify the relationship between the first garment piece and the second garment piece by comparing the first curve and the second curve. A fill pattern for the first garment piece and the second garment piece is generated (block 308) based on the relationship. For example, the pattern filling module 110 is implemented to generate the fill pattern for the first garment piece and the second garment piece based on the relationship.

Figure 4:
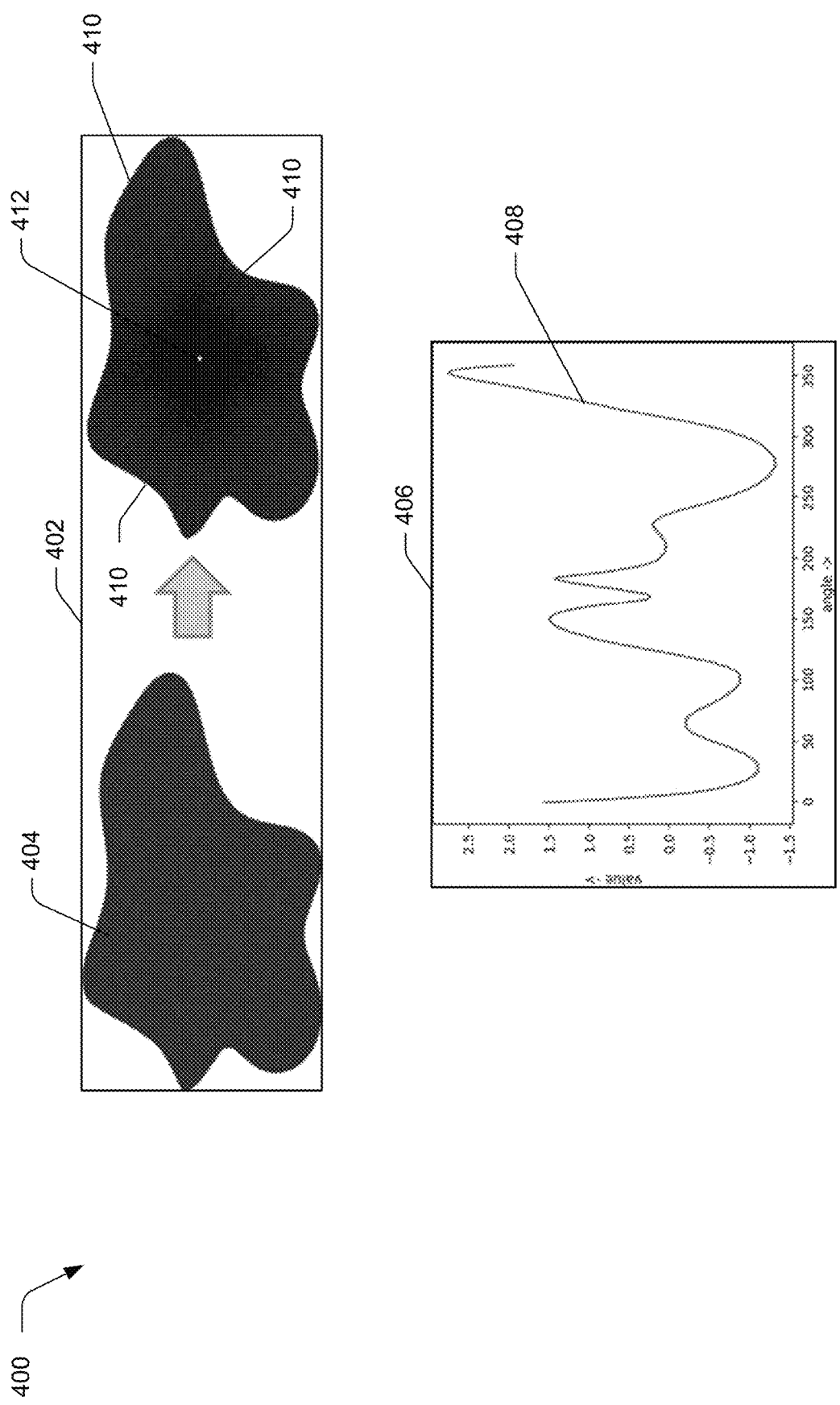
FIG. 4 is an illustration depicting a representation of an example of representing an example garment piece as a curve.

FIG. 4 is an illustration depicting a representation 400 of an example of representing a garment piece as a curve. As shown, the representation 400 includes a depiction 402 of a garment piece 404 as well as a graph 406 of a curve 408 which represents the garment piece 404. In one example, the curve 408 may be an R-Theta curve which encodes a geometry of the garment piece 404. The garment piece 404 is illustrated to include a boundary 410 and a centroid 412, and a distance from the centroid 412 to the boundary 410 is determined at each angle from 0 to 360 degrees in this example. For example, the distances between the centroid 412 and the boundary 410 at each angle are normalized to have a mean value equal to 0 and a standard deviation equal to 1, and these normalized values and their corresponding angles are illustrated in the graph 406 as the curve 408. This normalization may be accomplished by subtracting a non-normalized mean value from each distance value and dividing the result by a non-normalized standard deviation value such that the resulting distance values have a mean equal to 0 and a standard deviation equal to 1. By normalizing the distance values to have a mean value equal to 0 and a standard deviation equal to 1, the effects of scaling between objects is removed.

Figure 5:
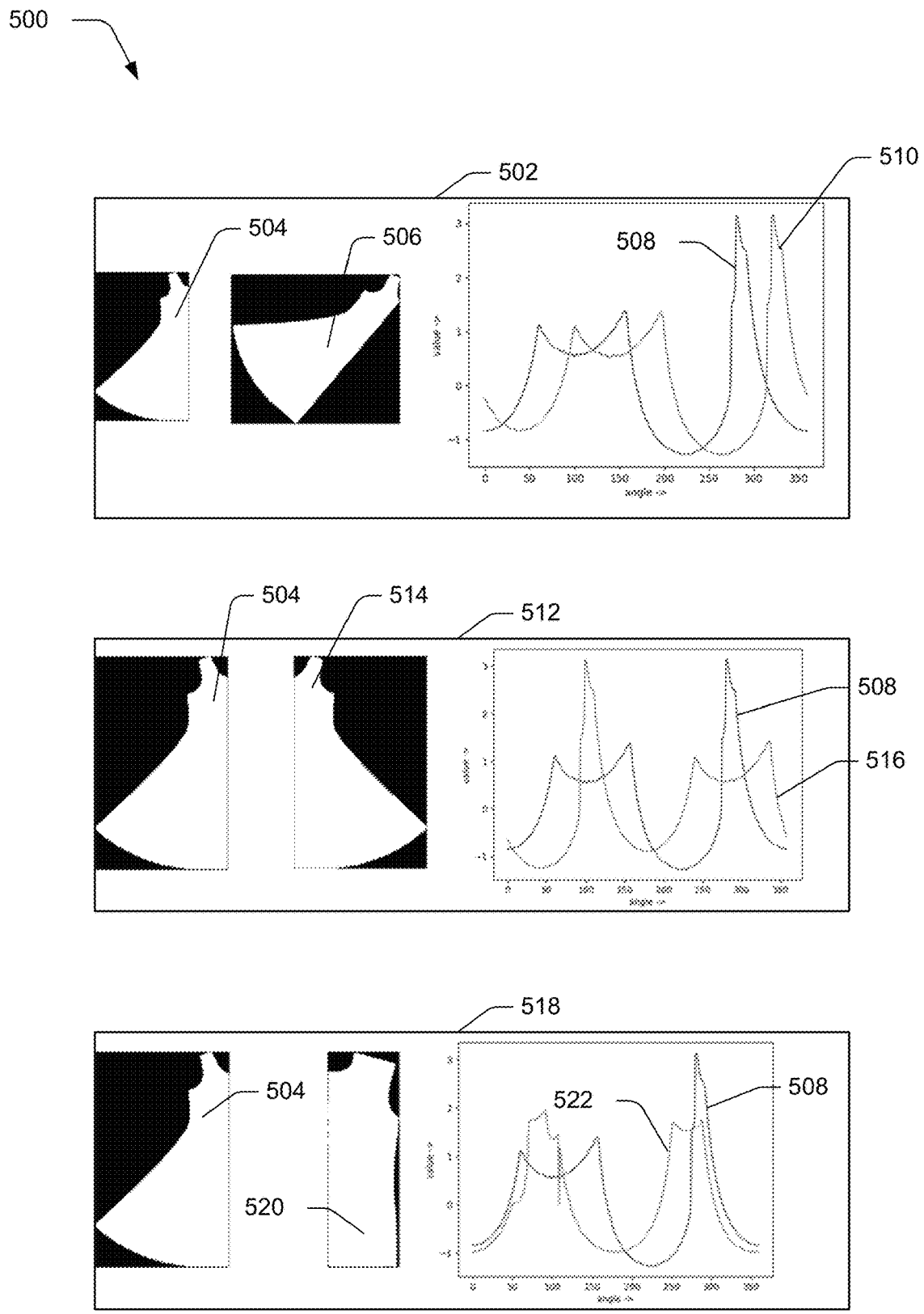
FIG. 5 is an illustration depicting example representations of identifying relationships between garment pieces by comparing curves which represent the garment pieces.

FIG. 5 is an illustration 500 depicting example representations of identifying relationships between garment pieces by comparing curves which represent the garment pieces. The illustration 500 includes a first representation 502 which includes a reference garment piece 504 and an example garment piece 506. The first representation 502 also includes a reference curve 508 which represents the reference garment piece 504 and an example curve 510 which represents the example garment piece 506. As shown in FIG. 5, the reference garment piece 504 and the example garment piece 506 are the same except that the example garment piece 506 is rotated relative to the reference garment piece 504. This relationship is also illustrated by comparing the reference curve 508 with the example curve 510. For example, the reference curve 508 and the example curve 510 are the same except the example curve 510 is shifted relative to the reference curve 508.

The illustration 500 also includes a second representation 512 which includes the reference garment piece 504 and an example garment piece 514 as well as the reference curve 508 that represents the reference garment piece 504 and an example curve 516 which represents the example garment piece 514. As shown in FIG. 5, the example garment piece 514 is a mirrored version of the reference garment piece 504. The mirrored relationship can also be determined by comparing the reference curve 508 with the example curve 516. For example, the example curve 516 is the same as the reference curve 508 except that the example curve 516 is reflected relative to a y-axis and thereafter shifted 180 degrees relative to the reference curve 508.

The illustration 500 additionally includes a third representation 518 which includes the reference garment piece 504 and an example garment piece 520. The third representation 518 also includes the reference curve 508 which represents the reference garment piece 504 and an example curve 522 that represents the example garment piece 520. As illustrated, the reference garment piece 504 and the example garment piece 520 are not the same and are not symmetric. This relationship may also be determined by comparing the reference curve 508 with the example curve 522. For example, the example curve 522 is not a shifted version of the reference curve 508 and comparison of these curves indicates that the example garment piece 520 is not the same as the reference garment piece 504.

Object Resizing Example

Figure 6:
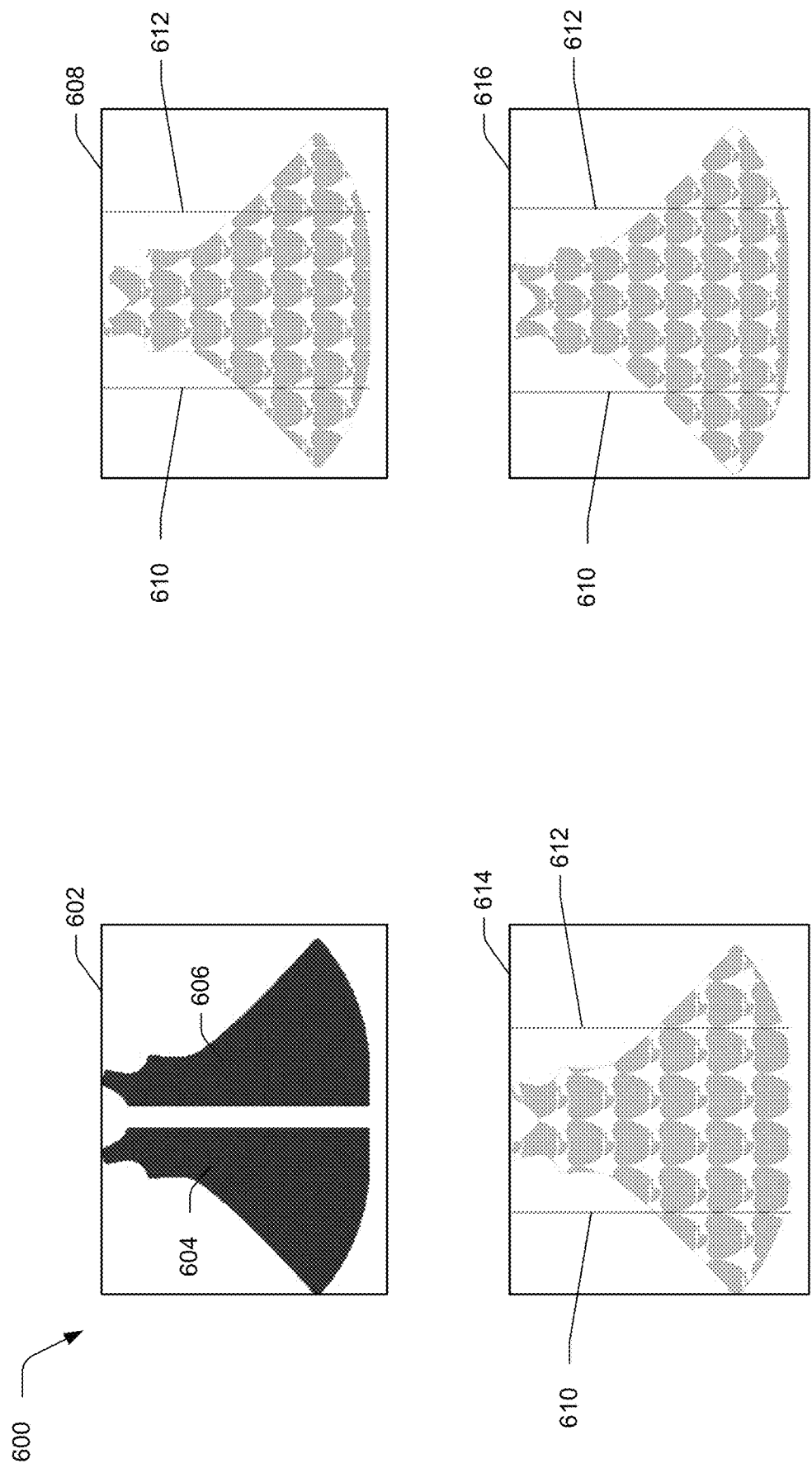
FIG. 6 is an illustration depicting example representations of pattern filling in garment pieces by object resizing.

FIG. 6 is an illustration 600 depicting example representations of pattern filling in garment pieces by object resizing.

The illustration 600 includes an input 602 which includes a first garment piece 604 and a second garment piece 606. In some examples, the input 602 can also include the object 120. The computing device 102 implements the pattern filling module 110 to determine a relationship between the first garment piece 604 and the second garment piece 606.

For example, the pattern filling module 110 is implemented to represent the first garment piece 604 as a first curve and represent the second garment piece 606 as a second curve, and the pattern filling module 110 compares the first curve and the second curve to determine that the second garment piece 606 is a mirror of the first garment piece 604. In one or more implementations, the pattern filling module 110 concatenates the first garment piece 604 and the second garment piece 606 based on the determined mirror relationship, and the pattern filling module 110 can use the object 120 to generate a fill pattern which is illustrated as representation 608. The representation 608 is a naive application of the object 120 as a fill pattern for the first garment piece 604 and the second garment piece 606 in which the object is arbitrarily placed and repeated as a fill pattern.

As shown, the representation 608 includes a first reference line 610 and a second reference line 612 which are equally spaced from adjacent portions of the first garment piece 604 and the second garment piece 606. Since the first reference line 610 and the second reference line 612 are equally spaced from the adjacent portions of the first garment piece 604 and the second garment piece 606, the reference lines may be used to generate fill patterns that are more visually pleasing than the fill pattern shown in representation 608. For example, the pattern filling module 110 identifies a distance between the first reference line 610 and the second reference line 612 and the pattern filling module 110 can then adjust a width of the object 120 based on the distance between the first reference line 610 and the second reference line 612.

Consider an example in which the pattern filling module 110 is implemented to scale the object 120 to generate fill patterns in which a particular number of objects 120 fits perfectly between the first reference line 610 and the second reference line 612 such that the objects 120 do not intersect the first reference line 610 or the second reference line 612. As illustrated in the lower portion of representation 608, four complete objects 120 are disposed between the first reference line 610 and the second reference line 612; however, the second reference line 612 also intersects several objects 120 in this fill pattern. In one or more implementations, the pattern filling module 110 scales the objects 120 to prevent these intersections and improves a visual appearance of a fill pattern using the objects 120.

For example, the pattern filling module 110 is implemented to identify a width of the object 120. The pattern filling module 110 determines how many complete objects 120 can fit between the first reference line 610 and the second reference line 612. The pattern filling module 110 also determines a width of the object 120 such that at least one row of objects 120 includes only complete objects 120 between the first reference line 610 and the second reference line 612. In this way, the pattern filling module 110 can scale the object 120 based on the determined width to generate a fill pattern.

Representation 614 includes a fill pattern in which objects 120 in a grid pattern have been upscaled to prevent the intersection between the objects 120 and the second reference line 612 as shown in representation 608. As illustrated in representation 614, the pattern filling module 110 has increased a width of the object 120 such that four complete objects 120 fit perfectly between the first reference line 610 and the second reference line 612 which improves a visual appearance of the fill pattern relative to the fill pattern of representation 608. For example, resizing the object 120 may improve a symmetry of fill patterns for the first garment piece 604 and the second garment piece 606. In an example, resizing the object 120 as shown in representation 614 may also improve continuity of the objects 120 across the first garment piece 604 and the second garment piece 606.

Representation 616 includes a fill pattern in which objects 120 in a grid pattern have been downscaled to fit five complete objects 120 between the first reference line 610 and the second reference line 612. As illustrated, downscaling the objects 120 also prevents the intersection between the objects 120 and the second reference line 612 as shown in representation 608. In one or more implementations, the pattern filling module 110 can decrease a width of the object 120 to generate a fill pattern which may represent a more visually pleasing fill pattern than the fill pattern of representation 608.

As illustrated in FIG. 6, the pattern filling module 110 can resize the object 120 to generate grid fill patterns with improved aesthetics by upscaling and/or downscaling the object 120 to fit a particular number of complete objects 120 between the first reference line 610 and the second reference line 612. In some examples, the pattern filling module 110 can generate fill patterns in this manner automatically and without user intervention. For example, given inputs of the first garment piece 604, the second garment piece 606, and the object 120, the pattern filling module 110 can determine a relationship between the first garment piece 604 and the second garment piece 606. The pattern filling module 110 can also concatenate the first garment piece 604 and the second garment piece 606 based on the determined relationship, and the pattern filling module 110 may resize the object 120 to generate example fill patterns such as shown in representation 614 and representation 616 automatically and without user intervention.

Although the examples depicted in FIG. 6 illustrate upscaling the objects 120 to include four complete objects 120 between the first reference line 610 and the second reference line 612 as shown in representation 614 and downscaling the objects 120 to include five complete objects 120 between the reference lines as shown in representation 616, the pattern filling module 110 is not limited to such functionality. For example, the pattern filling module 110 can upscale the objects 120 such that a single complete object 120 fits between the first reference line 610 and the second reference line 612. In another example, the pattern filling module 110 can downscale the objects 120 such that seven complete objects 120 or any number of complete objects 120 fit between the reference lines. Further, the pattern filling module 110 may scale objects 120 so that not all of the scaled objects 120 between the first reference line 610 and the second reference line 612 are necessarily complete objects 120. In one example, the pattern filling module 110 can scale objects 120 such that the first reference line 610 bisects one object 120 and the second reference line bisects another object 120.

Minimizing Object Loss Example

Figure 7:
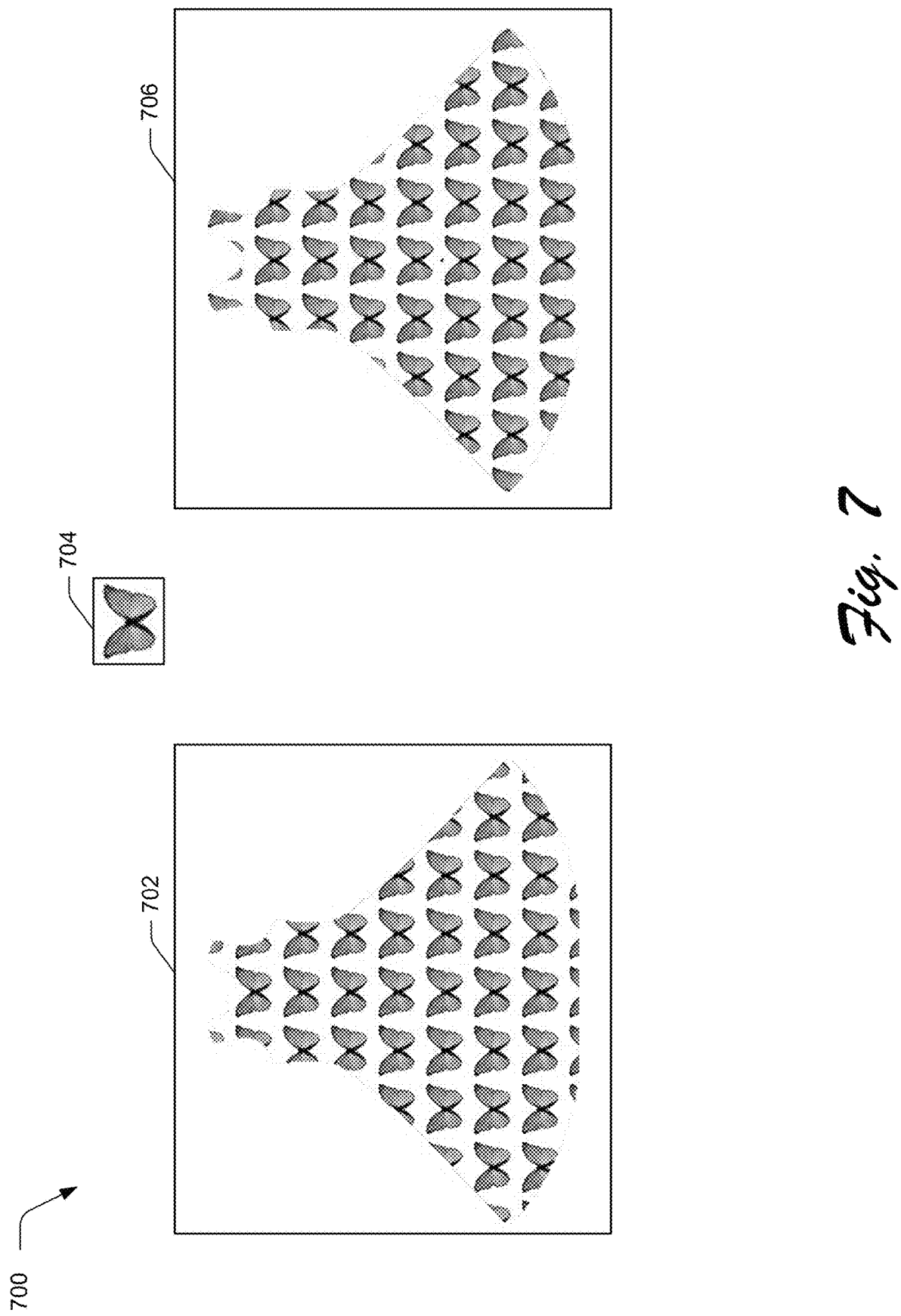
FIG. 7 is an illustration depicting an example representation of pattern filling in garment pieces by minimizing object loss.

FIG. 7 is an illustration 700 depicting an example representation of pattern filling in garment pieces by minimizing object loss. The illustration 700 includes representation 702 which has a fill pattern generated for the first garment piece 604 and the second garment piece 606 using object 704. In one or more implementations, the computing device 102 implements the pattern filling module 110 to generate fill patterns for garments by minimizing object loss which minimizes an amount of object 704 which is lost at edges of garments. An example of a fill pattern generated by minimizing object loss is shown in representation 706.

For example, the pattern filling module 110 determines a relationship between the first garment piece 604 and the second garment piece 606 and concatenates the first garment piece 604 and the second garment piece 606 based on the determined relationship. The pattern filling module 110 is implemented minimize object loss by iteratively considering candidate fill patterns for the first garment piece 604 and the second garment piece 606. The pattern filling module 110 identifies a fill pattern from the candidate fill patterns which has the least amount of lost objects 704, e.g., at the non-adjacent edges of the first garment piece 604 and the second garment piece 606.

For a given area of the first garment piece 604 and the second garment piece 606 and for a given area of the object 704, there can be many candidate fill patterns in which to arrange the objects 704. The pattern filling module 110 is implemented to identify a fill pattern from these candidate fill patterns which has the least amount of lost object 704 area at the edges of the garment. In some examples, the pattern filling module 110 can identify lost object 704 area in terms of pixels of objects 704 which are cutoff at the edges of the garment.

Consider an example in which the pattern filling module 110 identifies a fill pattern which minimizes object loss by iteratively generating fill patterns and determining an amount of object 704 loss in each fill pattern. For example, the pattern filling module 110 generates the fill pattern shown in representation 702 and the pattern filling module 110 determines a total amount of object 704 loss in this fill pattern. The pattern filling module 110 then generates another fill pattern by shifting the objects 704, e.g., by one pixel, and the pattern filling module 110 determines a total amount of object 704 loss in this other fill pattern. The pattern filling module 110 can then generate yet another fill pattern by shifting the objects 704, e.g., by an additional pixel, and determining an amount of object 704 loss. In this way, the pattern filling module 110 continues to generate candidate fill patterns by shifting objects 704 until an additional shift of the objects 704 recreates a previously considered candidate fill pattern. The pattern filling module can then identify a fill pattern from the candidate fill patterns having the least amount of object 704 loss, and this fill pattern is illustrated in representation 706.

By generating fill patterns to minimize object 704 loss, the pattern filling module 110 can improve a visual appearance of the fill pattern in the first garment piece 604 and the second garment piece 606. As shown in FIG. 7, the fill pattern of representation 706 appears more visually pleasing than the fill pattern of representation 702. This visual improvement may be due in part to a general desire to view complete objects rather than partial objects.

Object Resizing and Minimizing Object Loss Example

Figure 8:
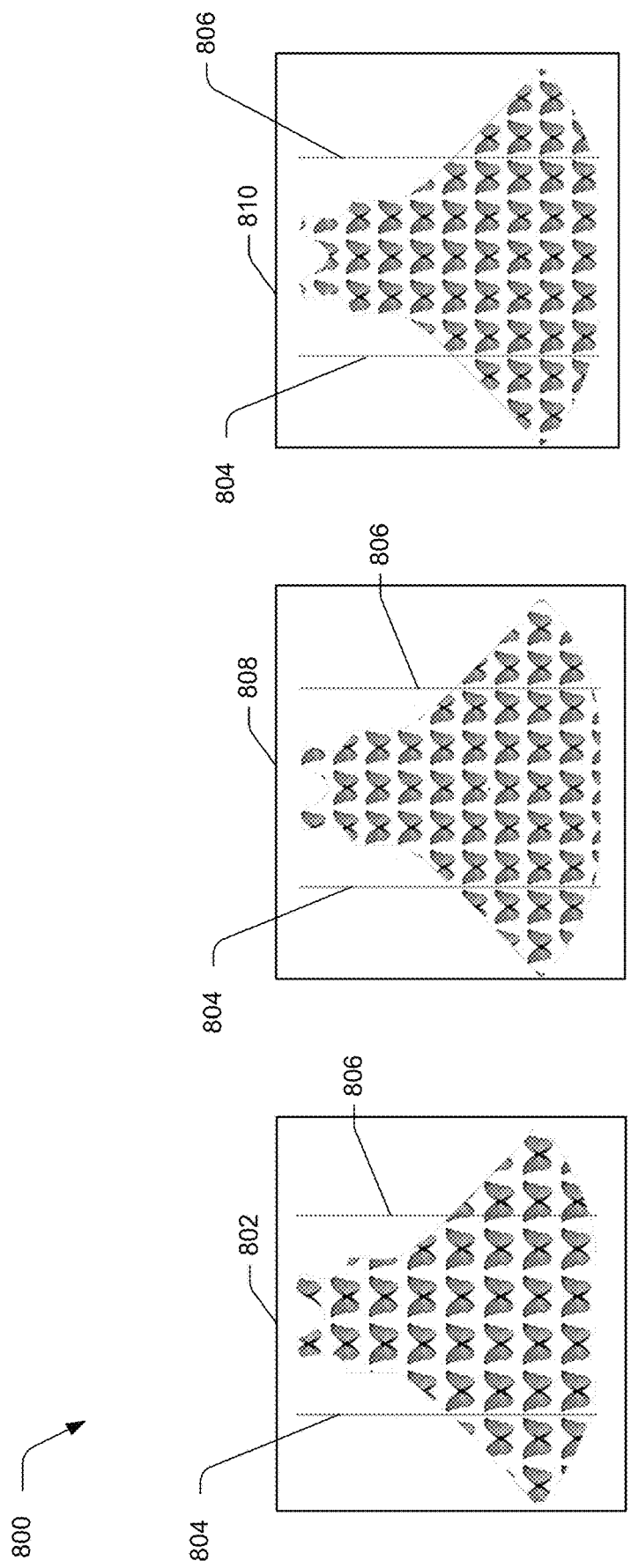
FIG. 8 is an illustration depicting an example representation of pattern filling in garment pieces by object resizing and minimizing object loss.

FIG. 8 is an illustration 800 depicting an example representation of pattern filling in garment pieces by object resizing and minimizing object loss. The illustration 800 includes representation 802 which shows a grid fill pattern as well as a first reference line 804 and a second reference line 806. In an example, the pattern filling module 110 is implemented to generate a fill pattern by resizing the objects 704 as shown in representation 808 which has downscaled objects 704. The pattern filling module 110 can then generate a fill pattern from the downscaled objects 704 which minimizes the object 704 loss as shown in representation 810. By generating fill patterns for garments with object resizing and minimizing object loss, the pattern filling module 110 may further improve aesthetic features in fill patterns. As shown in FIG. 8, the fill pattern of representation 810 may be more visually appealing than the fill pattern shown in representations 808 and 802.

Object Segmentation and Transformation Example

Figure 9A:
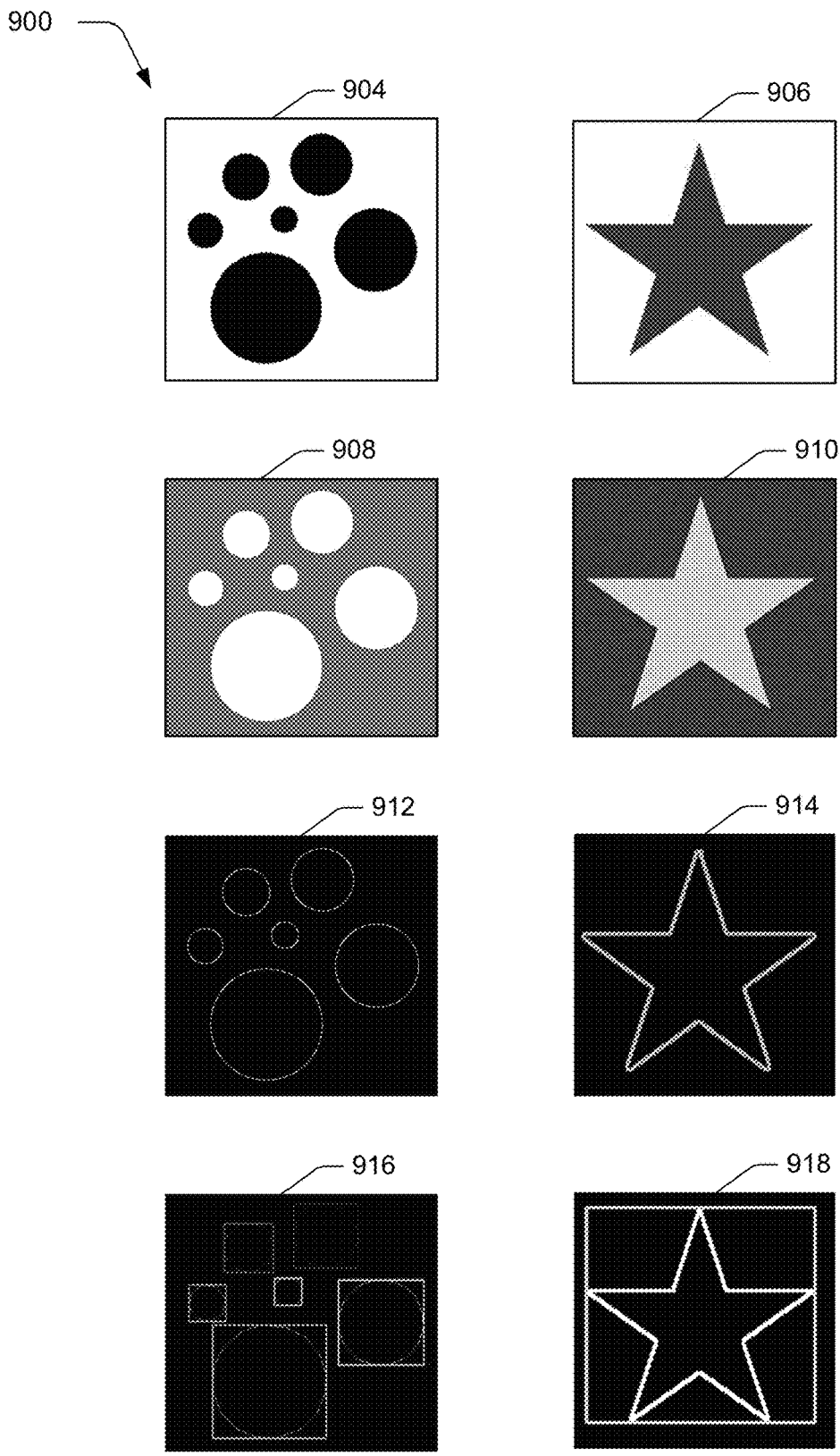
FIGS. 9A and 9B are illustrations depicting an example of pattern filling in garment pieces by object segmentation and transformation.
Figure 9B:
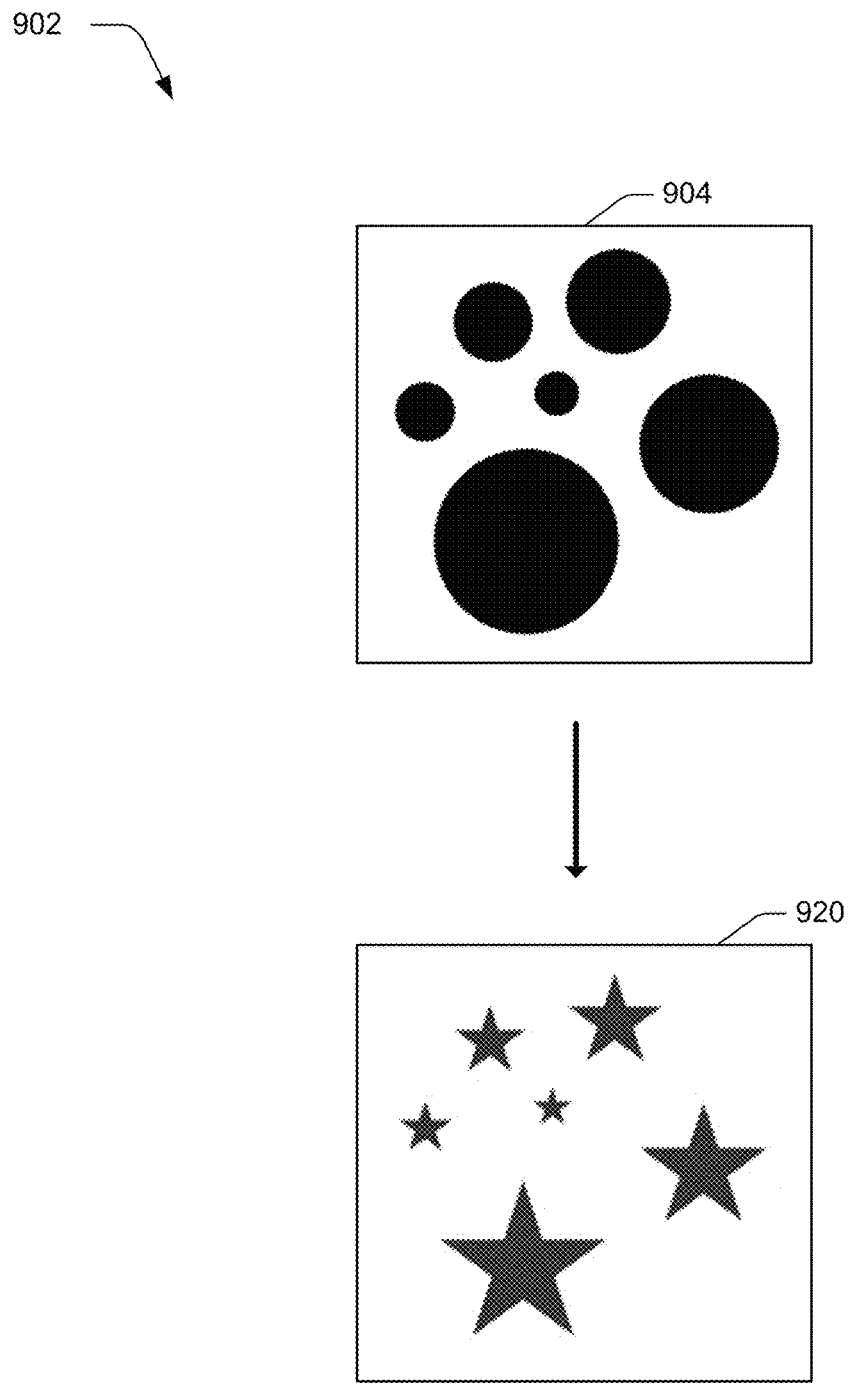

FIGS. 9A and 9B are illustrations depicting an example of pattern filling in garment pieces by object segmentation and transformation. FIG. 9A illustrates example representations 900 of object segmentation to perform a transformation, and FIG. 9B illustrates a representation 902 of an example transformation. As shown in FIG. 9A, the representations 900 include a base image 904 which can be a non-grid design of six circular objects of various sizes. These representations 900 also include as a target image 906 which has a star shaped target object in this example, and the pattern filling module 110 may be implemented to generate the base image design 904 transformed with the six circular objects replaced by six target objects 906 having a style similar to the six circular objects.

In one or more implementations, the pattern filling module 110 may identify objects in the base image 904 and the target object in the target image 906, and the pattern filling module 110 may segment each object identified separately. For example, the pattern filling module 110 may apply a smoothening filter chain to the base image 904 which may include applying pyramidical mean shift filtering to the base image 904 causing background texture to be flattened. In one example, the pattern filling module 110 may further reduce variance in the image by applying a smoothing filter to preserve edges. In another example, the pattern filling module 110 can convert the base image 904 and the target object 906 to LAB color space which is also known as CIELAB color space, and the pattern filling module 110 may calculate a mean for each channel in the LAB images.

Consider an example in which the pattern filling module 110 is implemented to generate a normalized heat map by computing an Euclidean distance for each pixel in the LAB image with the calculated mean values for each channel such as to generate a heat map image which is normalized for values in a range of 0 to 255. For example, the pattern filling module 110 may then enhance the heat map image by using histogram-based contrast enhancement and this enhanced image can be the final output of saliency generation. In one example, the pattern filling module 110 may apply a binary threshold to the enhanced heat images which are illustrated as a binarized base image 908 and a binarized target image 910.

In one or more implementations, the pattern filling module 110 may perform edge detection on the binarized base image 908 and the binarized target image 910. In one example, the pattern filling module 110 can remove noise around edges by performing morphological operations which merge nearby edges and minimize edge like noises. This is illustrated as an edge base image 912 and an edge target image 914. In another example, the pattern filling module 110 may dilate the images to expand boundaries of objects in the images which facilitates detection of bounding rectangles that are marginally larger than the actual bounding boxes of the objects. For example, the pattern filling module 110 can detect contours of each segmented object to determine an exact transformation required for object replacement which is illustrated as base image 916 and target image 918.

In one example, the pattern filling module 110 may extract each segmented object from the base image 916 using masking and graph-based extraction methods. In another example, the pattern filling module 110 can extract the target object from the target image 918 using similar methods. For example, the pattern filling module 110 may select an object closest to the center of the base image 916 as a reference object which reduces the possibility that the reference object will have partially cut-out edges. In an example in which there are multiple categories of objects in the image being replaced, the pattern filling module 110 may first cluster the extracted objects into a group and then select a reference object for each object. In one or more implementations, the pattern filling module 110 may generate a transformation matrix for each segmented base object with respect to the reference object and the pattern filling module 110 may then apply this transformation matrix on the target object to generate similarly transformed target objects. Finally, the pattern filling module 110 replaces the transformed target object with the respective base objects which is illustrated as a transformed image 920 in FIG. 9B.

As shown in FIG. 9B, the transformed image 920 includes the target star object in place of the circular objects in the base image 904. In this manner, the pattern filling module 110 can facilitate pattern filling in garment pieces using non-grid fill patterns. For example, the pattern filling module 110 can be implemented to allow a designer to use an existing design for creating a similar pattern with a new object. Reuse of existing designs as inspiration is common in the textile industry and the described techniques enable designers to cater to the fast-paced demand of this industry.

Figure 10:
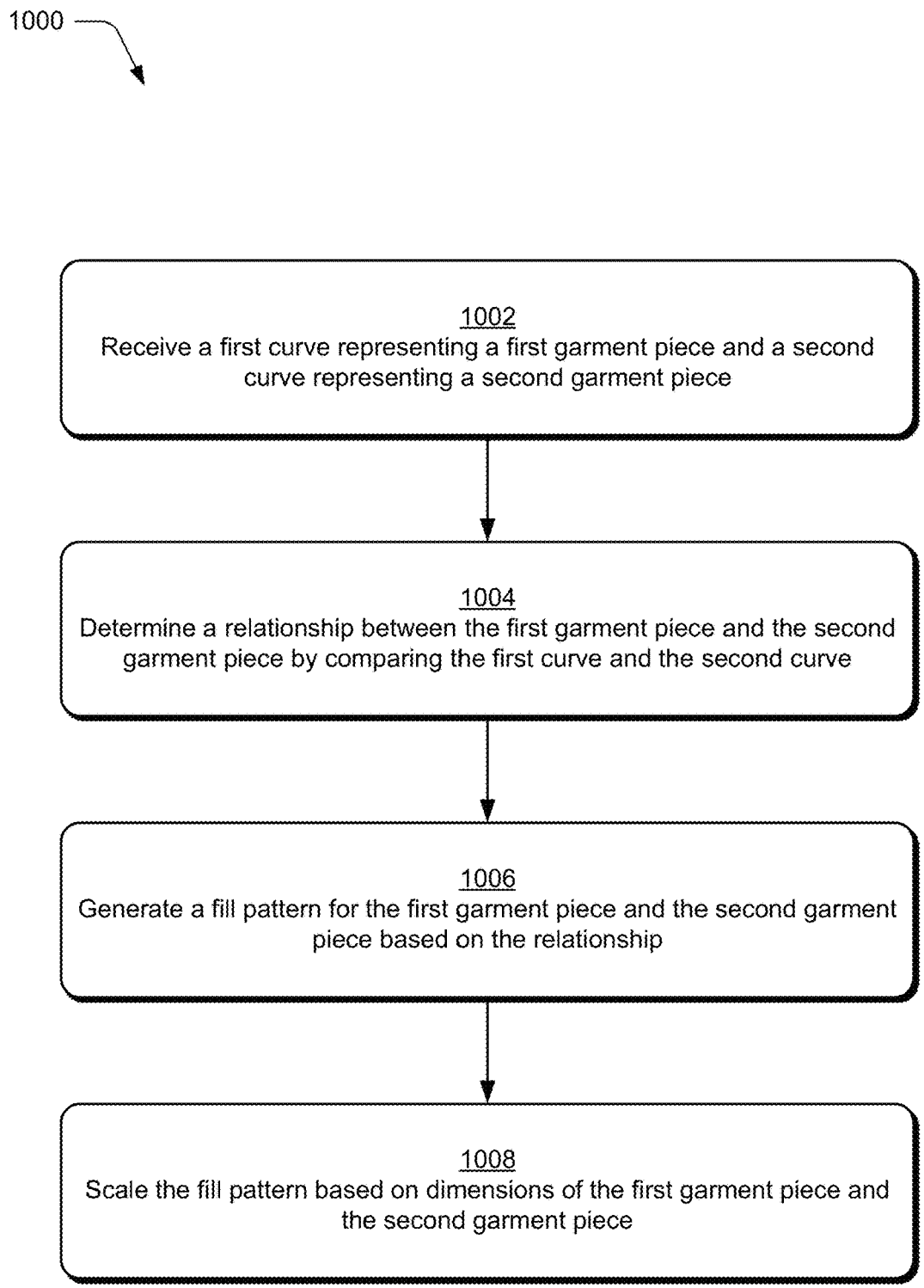
FIG. 10 is a flow diagram depicting a procedure in an example implementation in which a fill pattern is generated based on a relationship between a first and second garment piece and the fill pattern is scaled based on dimensions of the first and second garment piece.

FIG. 10 is a flow diagram depicting a procedure 1000 in an example implementation in which a fill pattern is generated based on a relationship between a first and second garment piece and the fill pattern is scaled based on dimensions of the first and second garment piece. A first curve representing a first garment piece and a second curve representing a second garment piece are received (block 1002). For example, the pattern filling module 110 receives the first curve representing the first garment piece and the second curve representing the second garment piece. A relationship between the first garment piece and the second garment piece is determined (block 1004) by comparing the first curve and the second curve. In one example, the pattern filling module 110 compares the first curve and the second curve to determine the relationship between the first garment piece and the second garment piece.

A fill pattern for the first garment piece and the second garment piece is generated (block 1006) based on the relationship. For example, the pattern filling module 110 generates the fill pattern for the first garment piece and the second garment piece based on the relationship between the first garment piece and the second garment piece. The fill pattern is scaled (block 1008) based on dimensions of the first garment piece and the second garment piece. In an example, the pattern filling module 110 scales the fill pattern based on the dimensions of the first garment piece and the second garment piece.

Figure 11:
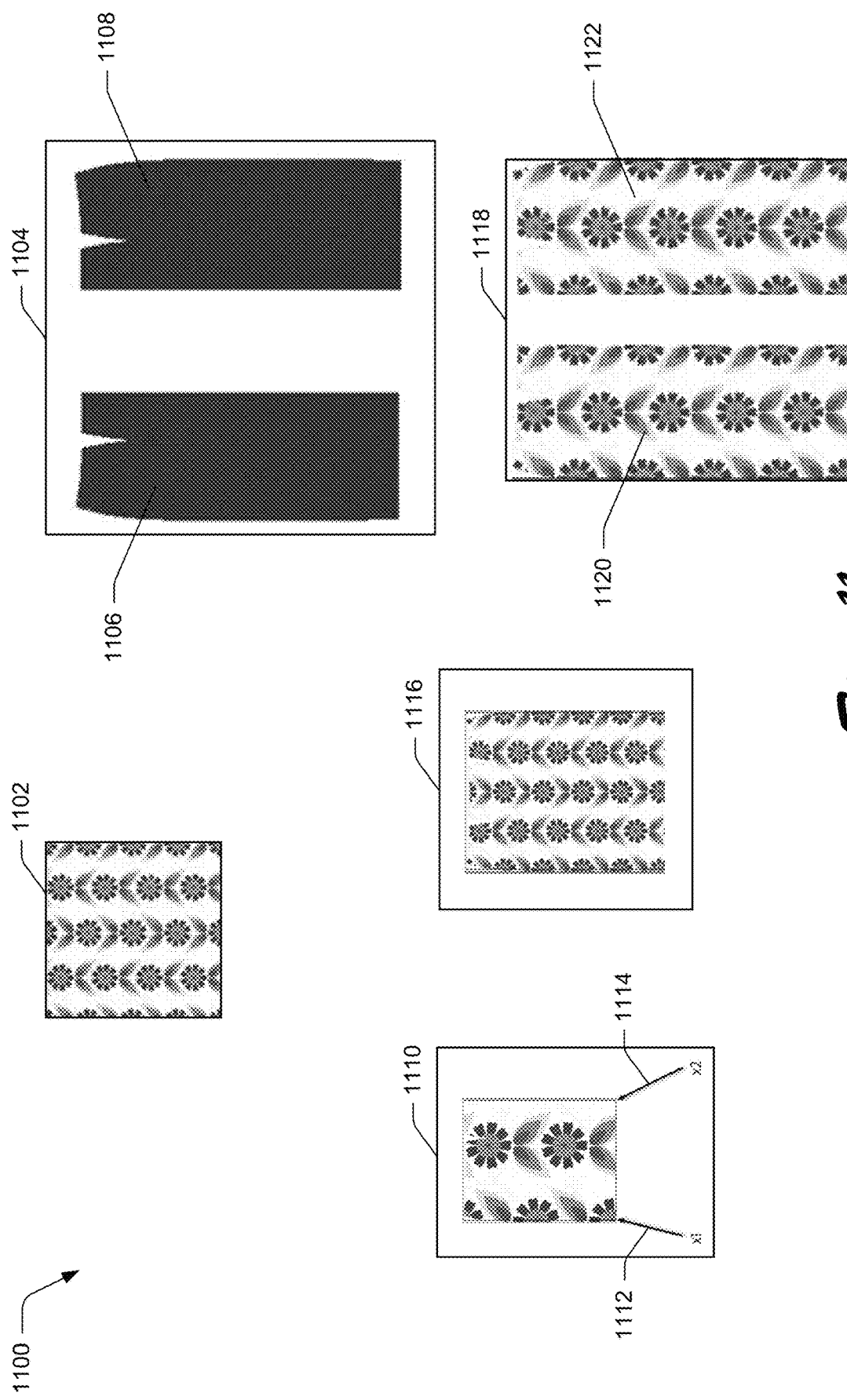
FIG. 11 is an illustration depicting an example representation of generating garment piece fill patterns based on an identified relationship between garment pieces.

FIG. 11 is an illustration depicting an example representation 1100 of generating garment piece fill patterns based on an identified relationship between garment pieces. The representation 1100 is illustrated to include an object 1102 and plain garment pieces 1104. As shown, the plain garment pieces 1104 include a left garment piece 1106 and a right garment piece 1108. For example, the pattern filling module 110 determines a relationship between the left garment piece 1106 and the right garment piece 1108 by representing the left garment piece 1106 as a first curve and by representing the right garment piece 1108 as a second curve. In one example, the pattern filling module 110 compares the first curve and the second curve and identifies a relationship between the left garment piece 1106 and the right garment piece 1108 as being a mirrored relationship.

As further illustrated in FIG. 11, the representation also includes an original width 1110 of the object 1102 which is illustrated by use of a first reference line 1112 and a second reference line 1114. As shown, application of the object 1102 with the original width 1110 to the left garment piece 1106 and the right garment piece 1108 as a fill pattern would be undesirable because the pattern shown in the object 1102 with the original width 1110 would be cutoff and asymmetric. In an example, the pattern filling module 110 is implemented to scale the object 1102 with the original width 1110 to generate a scaled object 1116. For example, the pattern filling module 110 applies the scaled object 1116 as a fill pattern for the left garment piece 1106 and the right garment piece 1108 to generate patterned garment pieces 1118. As shown, a patterned left garment piece 1120 and a patterned right garment piece 1122 are both visually pleasing, and the patterned garment pieces 1118 could be stitched together in a manner which would also be visually pleasing.

Example System and Device

Figure 12:
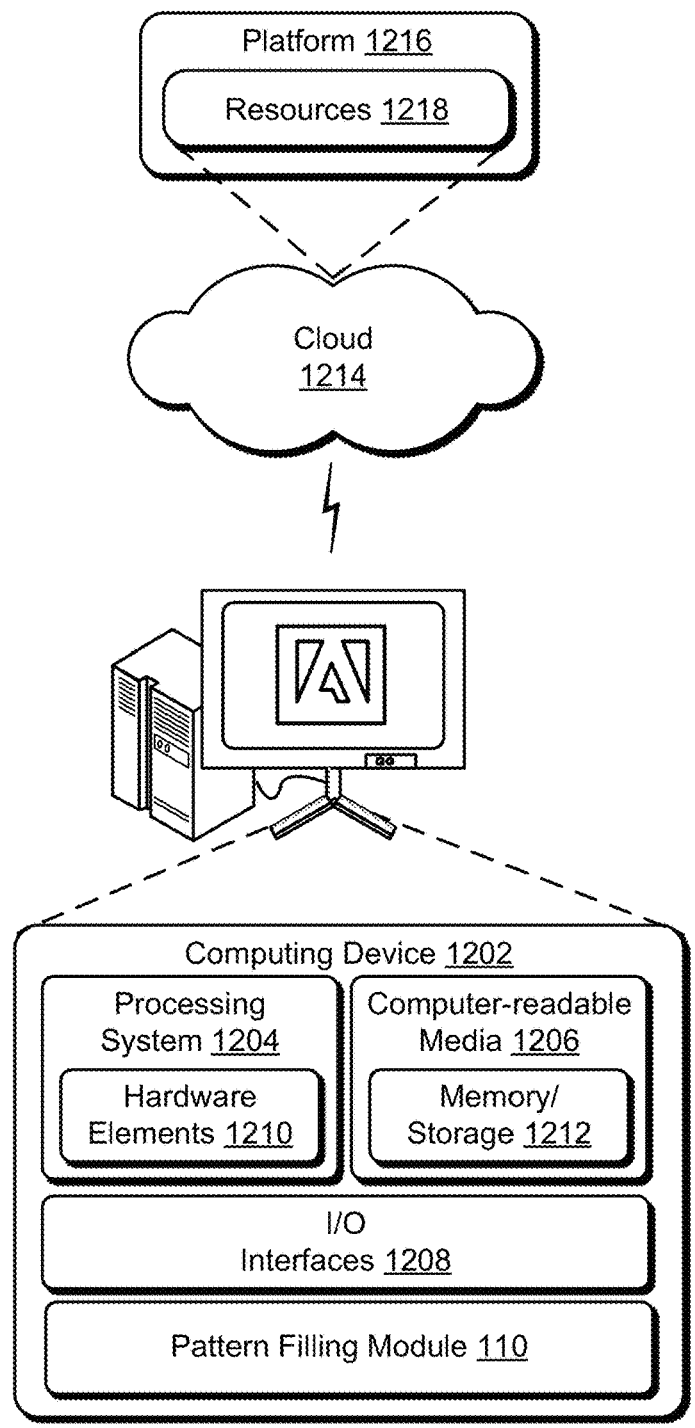
FIG. 12 illustrates an example system that includes an example computing device that is representative of one or more computing systems and/or devices that may implement the various techniques described herein.

FIG. 12 illustrates an example system 1200 that includes an example computing device that is representative of one or more computing systems and/or devices that may implement the various techniques described herein. This is illustrated through inclusion of the pattern filling module 110. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources 1218 and functions to connect the computing device 1202 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although implementations of pattern filling in garment pieces have been described in language specific to structural features and/or methods, it is to be understood that the appended claims are not necessarily limited to the specific features or methods described. Rather, the specific features and methods are disclosed as example implementations of pattern filling in garment pieces, and other equivalent features and methods are intended to be within the scope of the appended claims. Further, various different examples are described and it is to be appreciated that each described example can be implemented independently or in connection with one or more other described examples.

What is claimed is:

1. In a digital medium environment for automatic pattern filling in garment pieces, a method implemented by a computing device, the method comprising:
   representing, by the computing device, a first garment piece as a first R-Theta curve that encodes a geometry of the first garment piece based on a centroid of the first garment piece and distances determined from the centroid of the first garment piece to a boundary of the first garment piece;
   representing, by the computing device, a second garment piece as a second R-Theta curve that encodes a geometry of the second garment piece based on a centroid of the second garment piece and distances determined from the centroid of the second garment piece to a boundary of the second garment piece;
   normalizing, by the computing device, the first and second R-Theta curves, the first R-Theta curve is different from the second R-Theta curve before normalizing and the first R-Theta curve is identical to the second R-Theta curve after normalizing;
   identifying, by the computing device, a relationship between the first and second garment pieces as including a garment family relationship by comparing the first R-Theta curve and the second R-Theta curve after normalizing;
   generating, by the computing device, a fill pattern for the first and second garment pieces based on the relationship; and
   applying the fill pattern to the first and second garment pieces.

2. The method as described in claim 1, wherein generating the fill pattern is based on a number complete objects that fit between a reference point on the first garment piece and a reference point on the second garment piece, the reference point on the first garment piece and the reference point on the second garment piece equally spaced from an adjacent portion of the first and second garment pieces.

3. The method as described in claim 2, wherein the adjacent portion of the first and second garment pieces is determined based on the relationship.

4. The method as described in claim 1, wherein the first R-Theta curve is reflected about a y-axis relative to the second R-Theta curve after normalizing.

5. The method as described in claim 1, wherein the first R-Theta curve is shifted relative to the second R-Theta curve after normalizing.

6. The method as described in claim 1, wherein generating the fill pattern includes maximizing an amount of complete objects that fit on the first and second garment pieces.

7. The method as described in claim 1, wherein generating the fill pattern includes segmenting objects in an image.

8. In a digital medium environment for automatic pattern filling in garment pieces, a system comprising:
   an identification module implemented by one or more processing devices to:
      receive garment data describing garment pieces; and
      process the garment data to identify a first garment piece and a second garment piece;
   a representation module implemented by the one or more processing devices to:
      represent the first garment piece as a R-Theta first curve that encodes a geometry of the first garment piece based on a centroid of the first garment piece and distances determined from the centroid of the first garment piece to a boundary of the first garment piece;
      represent the second garment piece as a second R-Theta curve that encodes a geometry of the second garment piece based on a centroid of the second garment piece and distances determined from the centroid of the second garment piece to a boundary of the second garment piece; and
      normalize the first and second R-Theta curves, the first R-Theta curve is different from the second R-Theta curve before normalizing and the first R-Theta curve is identical to the second R-Theta curve after normalizing;
   a relationship module implemented by the one or more processing devices to identify a relationship between the first garment piece and the second garment piece as including a garment family relationship by comparing the first curve and the second curve after normalizing; and
   a generation module implemented by the one or more processing devices to:
      generate a fill pattern for the first garment piece and the second garment piece based on the relationship; and
      apply the fill pattern to the first garment piece and the second garment piece.

9. The system as described in claim 8, wherein the generation module is implemented to generate the fill pattern based on a number of repeating objects that fit between a point on the first garment piece and a point on the second garment piece the point on the first garment piece and the point on the second garment piece equally spaced from an adjacent portion of the first and second garment pieces.

10. The system as described in claim 9, wherein the generation module is implemented to resize the repeating objects to increase or decrease the number of repeating objects that fit between the point on the first garment piece and the point on the second garment piece.

11. The system as described in claim 8, wherein the relationship includes at least one of an identical relationship, a mirror relationship, or a rotated relationship.

12. The system as described in claim 8, wherein the generation module is implemented to generate the fill pattern by maximizing an amount of repeating objects that fit on the first and second garment pieces.

13. In a digital medium environment for automatic pattern filling in garment pieces, non-transitory computer-readable storage media storing instructions that when executed on a processor of a computing device cause the computing device to perform operations comprising:
    representing a first garment piece as a first R-Theta curve that encodes a geometry of the first garment piece based on a centroid of the first garment piece and distances determined from the centroid of the first garment piece to a boundary of the first garment piece;
    representing a second garment piece as a second R-Theta curve that encodes a geometry of the second garment piece based on a centroid of the second garment piece and distances determined from the centroid of the second garment piece to a boundary of the second garment piece;
    normalizing the first and second R-Theta curves, the first R-Theta curve is different from the second R-Theta curve before normalizing and the first R-Theta curve is identical to the second R-Theta curve after normalizing;
    determining a relationship between the first garment piece and the second garment piece as including a garment family relationship by comparing the first R-Theta curve and the second R-Theta curve after normalizing;
    generating a fill pattern for the first garment piece and the second garment piece based on the relationship; and
    applying the fill pattern to the first garment piece and the second garment piece.

14. The non-transitory computer-readable storage media as described in claim 13, wherein the relationship includes at least one of an identical relationship, a mirror relationship, or a rotated relationship.

15. The non-transitory computer-readable storage media as described in claim 13, wherein the fill pattern includes a plurality of repeating objects.

16. The non-transitory computer-readable storage media as described in claim 13, wherein the first R-Theta curve and the second R-Theta curve to have a mean of zero and a standard deviation of one after normalizing.

17. The system as described in claim 8, wherein the fill pattern is generated based on a number complete objects that fit between a reference point on the first garment piece and a reference point on the second garment piece, the reference point on the first garment piece and the reference point on the second garment piece equally spaced from an adjacent portion of the first and second garment pieces.

18. The method as described in claim 4, wherein the relationship includes a mirror relationship.

19. The method as described in claim 5, wherein the relationship includes a rotated relationship.

20. The non-transitory computer-readable storage media as described in claim 13, wherein the operations further comprise scaling the fill pattern based on dimensions of the first garment piece and the second garment piece.

* * * * *